United States Patent [19]

Reese et al.

[11] Patent Number: 5,834,529

[45] Date of Patent: Nov. 10, 1998

[54] PRESSURIZED, BLOWING AGENT-CONTAINING ISOCYANATE SEMIPREPOLYMER MIXTURES BASED ON LIGNIN-POLYETHER POLYOLS AND THEIR USE FOR PRODUCING POLYURETHANE FOAMS

[75] Inventors: Hans-Juergen Reese, Schwarzheide; Franz Heimpel, Affing; Heinz Forster, Wolfratshausen, all of Germany

[73] Assignee: Elastogran GmbH, Germany

[21] Appl. No.: 554,218

[22] Filed: Nov. 6, 1995

[30] Foreign Application Priority Data

Dec. 6, 1994 [DE] Germany ............... 44 43 431.6

[51] Int. Cl.[6] .................................................. C08G 18/04
[52] U.S. Cl. ................ 521/159; 521/84.1; 521/109.1; 521/174; 521/175
[58] Field of Search .................. 521/159, 84.1, 521/109.1, 174, 175

[56] References Cited

U.S. PATENT DOCUMENTS

| | | |
|---|---|---|
| 3,546,199 | 12/1970 | Christian et al. . |
| 3,654,194 | 4/1972 | Christian et al. . |
| 4,258,140 | 3/1981 | Horacek et al. . |
| 4,263,412 | 4/1981 | Pauls . |
| 4,489,176 | 12/1984 | Kluth et al. . |

FOREIGN PATENT DOCUMENTS

| | | |
|---|---|---|
| A-002768 | 7/1979 | European Pat. Off. . |
| 0 480 342 | 4/1992 | European Pat. Off. . |
| 3829 104 | 3/1990 | Germany . |
| 40 25 843 | 2/1992 | Germany . |
| A-58096619 | 6/1983 | Japan . |

OTHER PUBLICATIONS

European Search Report Dated Mar. 27, 1996; Translation of EPO Search Report.

*Primary Examiner*—John M. Cooney, Jr.
*Attorney, Agent, or Firm*—James J. Deake

[57] ABSTRACT

Pressurized, blowing agent-containing isocyanate semiprepolymer mixtures advantageously having an isocyanate content of from 5 to 25% and based on organic polyisocyanates and alkoxylated lignin having a hydroxyl number of from 30 to 80, preferably in admixture with lignin-free polyhydroxyl compounds are used for producing single-component polyurethane foams.

12 Claims, No Drawings

PRESSURIZED, BLOWING AGENT-CONTAINING ISOCYANATE SEMIPREPOLYMER MIXTURES BASED ON LIGNIN-POLYETHER POLYOLS AND THEIR USE FOR PRODUCING POLYURETHANE FOAMS

The invention relates to pressurized, blowing agent-containing isocyanate semiprepolymer mixtures advantageously having an isocyanate content of from 5 to 25%, which are obtainable by reacting hydroxyl-containing alkoxylated lignin or preferably mixtures of such lignins and lignin-free polyhydroxyl compounds with organic polyisocyanates in a reaction vessel in the presence of at least one blowing agent or subsequently treating the isocyanate semiprepolymers formed without blowing agent with at least one blowing agent. The invention also relates to a process for producing dimensionally stable polyurethane (PU) foams by allowing the pressurized isocyanate semiprepolymers to depressurize, react with the atmosphere, preferably atmospheric moisture, and cure. Such single component PU foams are used mainly in the building sector and their use encompasses, for example, the filling of cavities caused by the building method and the fixing of windows and doors in buildings.

Single-component mixtures for producing PU foams, their formative components and additives are known. For their production, for example, polyhydroxyl compound can be reacted in the presence or absence of, for example, catalysts, stabilizers, blowing agents and, if desired, further additives with a stoichiometric excess of organic polyisocyanates to give an isocyanate semiprepolymer.

Pressurized, blowing-agent containing isocyanate semiprepolymer mixtures are usually prepared by the following methods.

According to one process variant, the relatively high molecular weight polyhydroxyl compounds, catalysts, stabilizers and, if desired, low molecular weight hydroxyl-containing compounds and also additives such as flame retardants, plasticizers, dyes and pigments are mixed and reacted as polyol component with the polyisocyanate component containing the organic polyisocyanates and, if desired, additives which are inert toward isocyanate groups. For this purpose, the polyol and polyisocyanate components can be charged into a pressure container, for example an aerosol can, via suitable metering facilities, either individually in succession or simultaneously or in he form of a finished mixture from a suitable mixing apparatus. The filled pressure container is subsequently provided with a discharge valve and is, advantageously via this, treated with one or more blowing agents. If required, the pressure containers can be treated in a tumbling or shaking apparatus to intensively mix the isocyanate semiprepolymers and blowing agents.

In another process variant, the isocyanate semiprepolymers can be prepared in a manner known per se by reacting organic polyisocyanates initially charged in heatable stirred vessel with the polyhydroxyl compounds. If the isocyanate semiprepolymer preparation is carried out in the absence of catalysts, stabilizers and, if desired, other additives, these are incorporated into the reaction mixture in the course of the prepolymer formation or thereafter. The isocyanate semiprepolymer mixture obtained is, as described above, charged into pressure container, this is provided with a discharge valve, and is treated with the blowing agent or a blowing agent mixture.

According to these process variants, isocyanate semiprepolymer mixtures prepared from polyhydroxyl compounds and excess polyisocyanates in the presence of catalysts and stabilizers have to be admixed with a high content of blowing agents liquefied under pressure, preferably chlorofluorocarbons (CFCs), to obtain foamable isocyanate semiprepolymer mixtures which flow readily and/or can be released from the pressure container in the required amounts.

So as to do without the CFCs which endanger the ozone layer and because of the need to use alternative, more expensive blowing agents, attempts have been made to prepare low-viscosity isocyanate prepolymers by means of suitable measures.

Thus, DE-A-40 25 843 describe storage-stable, single-component mixtures for producing PU foams, which mixtures have a dynamic viscosity of the isocyanate prepolymers of from 200 to 4,000 mpa·s and contain carbon dioxide as blowing agent and plasticizers for reducing the visosity. A disadvantage of such single-component mixtures is that the plasticizers are not built into the urethane framework and therefore tend to migrate out and cause shrinkage of the PU foam. According to P-A-0480 342, the single-component mixtures for producing PU foams contain compressible gases such as helium, neon, argon, nitrogen, oxygen, carbon dioxide, nitrous oxide ($N_2O$) or air as blowing agent. Their low viscosity of from 500 to 12,000 mpa·s, preferably less than 10,000 mpa·s, measured at 20° C., is achieved by the additional use of viscosity-reducing solvents such as ethers, ester and ketones, in particular acetone or methyl ethyl ketone, which soften the polyurethane skeleton and thereby cause increased shrinkage. The use of an expanding PU adhesive for joining insulation materials to parts of buildings is described in DE-A-33 17 193 (U.S. Pat. No. 4,489,176). The PU preparations, which cure with volume expansion on exposure to moisture, comprise up to 80% by weight of a PU prepolymer, foam stabilizers and from 10 to 20% by weight of a diluent having a boiling point from room temperature to 60° C. High-boiling plasticizers, for example butyl benzyl phthalate, tris(monochloroisopropyl) phosphate or trichloroethyl phosphate, together with partially halogenated hydrocarbons, for example dichlorofluoromethane (R22), are, according to DE-A-38 29 104, used for preparing isocyanate prepolymer mixtures which, on discharge in liquid form from a pressure container, react with moisture to give PU foams. A disadvantage of the latter process is that the additional use of the diluents, plasticizers such as diphenyl cresyl phosphate or dioctyl phthalate, or high-boiling plasticizers favors and frequently increases the tendency of the PU foams to shrink.

EP-A-0 002 768 (U.S. Pat. No. 4,258,140) describes a process for producing dimensionally stable single-component PU foams by depressurization and curing in the presence of atmospheric moisture of a pressurized isocyanate semiprepolymer mixture based on difunctional to octafunctional polyester and/or polyether polyols containing tertiary amino groups bound to the polymer chain and having a hydroxyl number of from 40 to 500 and organic polyisocyanates such as mixtures of diphenylmethane diisocyanates (MDI) and polyphenyl-polymethylene polyisocyanates, referred to in abbreviated form as raw MDI. According to DE-A-28 42 246 (U.S. Pat. No. 4,263, 412), isocyanate semiprepolymer mixtures which can be used for producing dimensionally stable single-component PU foams and have a relatively low content of blowing agents can be introduced in the inner container of a two-chamber pressure pack which contains a pressure medium in the outer container, and be taken out when needed via a withdrawal facility.

Also known are polyoxyalkylene polyols prepared using lignin and tannin as initiator molecules. According to U.S. Pat. Nos. 3,546,199 and 3,654,194, lignin or tannin can be alkoxylated in the presence or absence of solvents with alkylene oxides, for example 1,2-propylene oxide, at from 2° to 250° C. and at atmospheric or superatmospheric pressure. The polyoxyalkylene polyols prepared have hydroxyl numbers in the range from 50 to 1,000, preferably from 200 to 800, and are suitable for producing flexible to rigid PU foams by reaction with organic polyisocyanates.

The compounds which react with NCO groups used for the production of polyisocyanate polyaddition products are usually synthetic polyhydroxyl compounds, preferably polyester polyols and polyoxyalkylene polyols. However, from an ecological point of view it seems advantageous to completely or at least partially replace the synthetically prepared polyhydroxyl compounds by hydroxyl-containing natural materials. The use of regenerable hydroxyl-containing natural materials requires no complicated technical syntheses. A further advantage is that natural materials obtained as waste products in other areas can be industrially utilized, possibly after slight technical treatment and/or purification. The use of novel starting materials enables the production of polyisocyanate polyaddition products having different mechanical properties, which in turn open p new possible uses. Classical natural materials which are already used as starting materials in polyurethane chemistry are, for example, natural oils, such as tall oil and castor oil, polyhydric alcohols such as glycerol and the sugar alcohols and fatty acids. An important waste material is lignin which is unavoidably obtained as byproduct in the production of cellulose or paper pulp from wood. However, owing to its low reactivity, the direct processing of solid lignin as hydroxyl-containing natural material to give polyurethanes presents difficulties. Lignin solutions are usually highly viscous and not readily miscible with organic polyisocyanates.

It is an object of the present invention to develop readily processable isocyanate semiprepolymers using hydroxyl-containing natural materials or polyhydroxyl compounds made from these, which semiprepolymers can, when provided with a low content of blowing agent, be reacted to give single-component PU foams. The PU foams obtained should be dimensionally stable, ie. have essentially no shrinkage.

We have found that this object is achieved by the use of an alkoxylated lignin for preparing the isocyanate semiprepolymer mixture.

The invention accordingly provides pressurized, blowing agent-containing isocyanate semiprepolymer mixtures obtainable by reacting A) at least one relatively high molecular weight polyhydroxyl compound with B) at least one organic polyisocyanate in a reaction vessel in the presence of at least one blowing agent or by treatment of the isocyanate semiprepolymer formed without blowing agent with at least one blowing agent, wherein the polyhydroxyl compound (A) used is at least one alkoxylated lignin having a hydroxyl number of from 30 to 80.

The pressurized, blowing agent containing isocyanate semiprepolymer mixtures are preferably prepared by reacting the relatively high molecular weight polyhydroxyl compounds (A) and organic polyisocyanates (B) essential to the invention in the presence of C) catalysts, D) stabilizers and E) if desired, blowing agents and F) if desired, further additives The invention also provides, a claimed in claim 8, for the use of the blowing agent-containing isocyanate semiprepolymer mixtures pressurized in a pressure container for producing single-component PU foams by depressurizing the contents of the pressure container and, as claimed in claim 9 or 10, a process for producing dimensionally stable polyurethane foams by depressurizing a storage-stable, pressurized, b owing agent-containing isocyanate semiprepolymer mixture based on polyhydroxyl compounds (A) and organic polyisocyanates (B) an allowing it to cure in contact with the atmosphere, wherein the polyhydroxyl compound (A) used for preparing the isocyanate semiprepolymer is an alkoxylated lignin (A1) having a hydroxyl umber of from 30 to 80 A process for producing dimensionally stable polyurethane foams by depressurizing a storage-stable, pressurized, blowing agent-containing isocyanate semiprepolymer mixture based on polyhydroxyl compounds (A) and organic polyisocyanates (B) and allowing it to cure in contact with the atmosphere, wherein the polyhydroxyl compound (A) used for preparing the isocyanate semiprepolymer is an alkoxylated lignin (A1) having a hydroxyl number of from 30 to 80 or preferably a mixture of said alkoxylated lignin (A1) and a lignin-free polyhydroxyl compound (A2) having a functionality of from 2 to 8 and a hydroxyl number of from 25 to 370.

Although alkoxylated lignins having hydroxyl numbers above 300 are highly viscous, it has surprisingly been found that the alkoxylated lignins (A1) or mixtures of (A1) and lignin-free polyhydroxyl compounds (A2) which can be used according to the invention give, on reaction with organic polyisocyanates (B) relatively low-viscosity, free flowing and readily processable isocyanate semiprepolymers. Ho ever, the physical properties such as viscosity, flowability, reactivity, etc. of the isocyanate semiprepolymers and the mechanical properties of the PU foams produced therefrom can be modified and be matched to the processing and use conditions not only by means of the chemical structure and composition of the polyhydroxyl compounds (A) but also by the type, composition and amount of the organic polyisocyanates (B).

Raw MDI having a high MDI content was, for example, despite its advantageous low viscosity, able to be used for forming neither two-component nor single-component PU rigid foams by depressurization of the reaction mixture from pressure vessels, since the cured PU foams obtained have an excessively high brittleness. By means of the relatively high molecular weight alkoxylated lignins able to be used according to the invention, it was not only possible to avoid or at least reduce the brittleness of the cured PU rigid foams but also to simultaneously lower the viscosity of the isocyanate semiprepolymers.

A further advantage is that the isocyanate semiprepolymer mixture can be virtually completely expressed from the pressure container using a significantly reduced amount of blowing agent.

The isocyanate semiprepolymers used for preparing the pressurized, blowing agent-containing isocyanate semiprepolymer mixtures advantageously have an NCO content of from 5 to 25% by weight, preferably from 8 to 20% by weight and in particular from 9 to 13% by weight, based on the weight of the isocyanate semiprepolymers, and are, as already indicated, prepared by reacting at least one alkoxylated lignin (A1) having a hydroxyl number of from 30 to 80 or preferably a mixture of (A1) and lignin-free polyhydroxyl compounds (A2) with at least one organic polyisocyanate, preferably a polyisocyanate mixture, for example at least one aliphatic, cycloaliphatic and/or preferably aromatic polyisocyanate, in the absence or preferably in the presence of catalysts (C) and stabilizers D). The isocyanate semiprepolymer preparation can furthermore be carried out in the absence or presence of blowing agents (E) and further additives (F); in a preferred embodiment the isocyanate semiprepolymer preparation is carried out in the absence of blowing agents (E) since these are advantageously incorporated afterwards into the isocyanate semiprepolymer formed.

A) The polyhydroxyl compounds (A) used according to the invention for preparing the isocyanate semiprepolymers are alkoxylated lignins (A1) having hydroxyl number of from 30 to 80, preferably from 40 to 60 and in particular from 45 to 55, which are advantageously lignin-initiated polyoxypropylene polyols, or mixtures of such alkoxylated lignins. However, other suitable polyhydroxyl compounds are, for example, lignin-initiated polyoxypropylene-polyoxyethylene polyols and lignin-initiated polyoxyethylene polyols and also mixtures of at least two of the lignin-containing polyoxyalkylene polyols mentioned by way of example. Suitable lignin-containing polyoxyalkylene polyols can be prepared, for example, using methods similar to those given in U.S. Pat. Nos. 3,546,199 and 3,654,194, which are incorporated by reference into this patent description.

The relatively high molecular weight polyhydroxyl compounds (A) can consist exclusively of the alkoxylated lignins (A1) usable according to the invention. However, according to a preferred embodiment, the relatively high molecular weight polyhydroxyl compounds (A) are advantageously mixtures containing, based on the total weight, from 5 to 65% by weight, preferably from 8 to 40% by weight and in particular from 10 to 20% by weight, of alkoxylated lignins (A1). The mixtures of relatively high molecular weight polyhydroxyl compounds (A) which are preferably used thus advantageously comprise, based on the total weight, (A1) from 5 to 65% by weight, preferably from 8 to 40% by weight and in particular from 10 to 20% by weight, of at least one alkoxylated lignin having a hydroxyl number of from 30 to 80 and (A2) from 95 to 35% by weight, preferably from 92 to 60% by weight and in particular from 90 to 80% by weight, of at least one lignin-free polyhydroxyl compound having a functionality of from 2 to 8 and a hydroxyl number of from 25 to 370.

Suitable lignin-free relatively high molecular weight polyhydroxyl compounds (A2) usually have, as indicated above, a functionality of from 2 to 8 and a hydroxyl number of from 25 to 370, with lignin-free polyhydroxyl compounds having a functionality of preferably from 2 to 3 and a hydroxyl number of preferably from 30 to 0 being advantageously used for preparing isocyanate semiprepolymer mixtures for flexible PU foams and lignin-free polhydroxyl compounds having a functionality of preferably from 3 to 8 and in particular from 3 to 6 and a hydroxyl number of preferably from 100 to 350 being advantageously used for preparing isocyanate semiprepolymer mixtures for rigid PU foams. The lignin-free polyhydroxyl compounds used are preferably linear and/or branched polyester polyols and in Particular linear and/or branched polyoxyalkylene polyols, with polyhydroxyl compounds from regenerable natural materials and/or chemically modified regenerable natural materials being particularly preferred. However, suitable lignin-free polyhydroxyl compounds (A2) also include polymer-modified polyoxyalkylene polyols, polyoxyalkylene polyol dispersions and other hydroxyl-containing polymers and polycondensates having the abovementioned functionalities and hydroxyl numbers, for example polyesteramides, polyacetals and/or polycarbonates, in particular those prepared from diphenyl carbonate and 1,6-hexanediol by transesterification, or mixtures of at least two of the relatively high molecular weight polyhydroxyl compounds specified.

Suitable polyesterpolyols an be prepared, for example, from organic dicarboxylic acids having from 2 to 12 carbon atoms, preferably aliphatic dicarboxylic acids having from 4 to 6 carbon atoms, and/or fatty acids having from 12 to 26 carbon atoms, preferably from 14 to 18 carbon atoms, and polyhydric alcohols, preferably alkanediols having from 2 to 12 carbon atoms, preferably from 2 to 6 carbon atoms, dialkylene glycols and/or alkanetriol having from 3 to 6 carbon atoms. Suitable dicarboxylic acid are, for example: succinic acid, glutaric acid, adipic acid suberic acid, azelaic acid, sebacic acid, decanedicarboxylic acid, maleic acid, fumaric acid, phthalic acid, isophthalic acid and terephthalic acid. Examples of fatty acids which may be mentioned are: lauric, myristic, palmitic and stearic acids. The monocarboxylic and dicarboxylic acids can her be used either individually or in admixture with one another In place of the free monocarboxylic and dicarboxylic a ids, it is also possible to use the corresponding carboxylic acid derivatives, for example dicarboxylic esters of alcohols having from 1 to 4 carbon atoms or dicarboxylic anhydrides. Preference is given to using dicarboxylic acid mixtures of succinic, glutaric and adipic acids in weight ratios of, for example, 20 to 35:35 to 50:20 to 32, and in particular adipic acid. Examples of dihydric and polyhydric alcohols, in particular alkanediols and dialkylene glycols are: ethanediol, diethylene glycol, 1,2-or 1,3-propanediol, dipropylene glycol, 1,4-butanediol, 1,5-pentanediol, 1,6-hexanediol, 1,1-decanediol, glycerol and trimethylolpropane. Preference is given to using ethanediol, diethylene glycol, 1,4-butanediol, 1,5-pentanediol, 1,6-hexanediol, glycerol or mixtures of at least two of the specified alkanediols, in particular, for example, mixtures of 1,4-butanediol, 1,5-pentanediol and 1,6-hexanediol. It is also possible to use polyester polyols from lactones, eg. ε-caprolactone or hydroxycarboxylic acids, e.g. ω-hydroxycaproic acid.

To prepare the polyester polyols, the organic, for example aromatic and preferably aliphatic monocarboxylic acids, polycarboxylic acids and/or derivatives and polyhydric alcohols and/or alkylene glycols can be polycondensed in the absence of catalysts or preferably in the presence of esterification catalysts, advantageously in an atmosphere of inert gases, for example nitrogen, helium, argon, etc., in the melt at from 150° to 250° C., preferably from 180° to 220° C., at atmospheric or subatmospheric pressure, to the desired acid number which is advantageously less than 10, preferably less than 2. According to a preferred embodiment, the esterification mixture is polycondensed at the above temperatures to an acid number of from 8 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation.

To prepare the polyester polyols, the organic polycarboxylic acids and/or derivatives and polyhydric alcohols are advantageously polycondensed in a molar ratio of 1:1 to 1.8, preferably 1:1.05 to 1.2.

The polyester polyols obtained preferably have a functionality of from 2 to 4, in particular from 2 to 3, and a hydroxyl number of from 240 to 30, preferably from 180 to 40.

However, lignin-free polyhydroxyl compounds which are preferably used are polyoxyalkylene polyols which are prepared by known methods, for example by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably 2 or 3, reactive hydrogens in bound form for preparing polyoxyalkylene polyols for flexible PU foams and containing preferably from 3 to 8 reactive hydrogens in bound form for preparing polyoxyalkylene polyols for semirigid and rigid PU foams, or by cationic polymerization using Lewis acids, such as antimony pentachloride, boron fluoride etherate, etc., or bleaching earth as catalysts, from one or more alkylene oxides having from 2 to 4 carbon atoms in the alkylene radical. Suitable alkylene oxides are, for example, tetrahydrofuran, 1,3-propylene oxide, 1,2- or 2,3-butylene oxide and preferably ethylene oxide and 1,-propylene oxide. The alkylene oxides can be used individually, alternately in succession or as mixtures. Suitable initiator molecules are, for example: water, organic dicarboxylic acids such as succinic acid, adipic acid, phthalic acid and terephthalic acid, aliphatic and aromatic, unsubstituted or N-monoalkylated or N,N- or N,N'-dialkylated diamines having from 1 to 4 carbon atoms in the alkyl radical, such as unsubstituted or monoalkylated or dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Other suitable initiator molecules are: alkanolamines such as ethanolamine, N-methylethanolamine and N-ethylethanolamine, dialkanolamines such as diethanolamine, N-methyldiethanolamine and N-ethyldiethanolamine and trialkanolamines such as triethanolamine and ammonia. Preference is given to using polyhydric, in particular dihydric to octahydric alcohols and/or alkylene glycols such as ethanediol, 1,2- and 1,3-propanediol, diethylene glycol, dipropylene glycol, 1,4-butanediol, 1,6-hexanediol, glycerol, trimethylolproppane, pentaerythritol, sorbitol and sucrose and also mixtures of at least 2 polyhydric alcohols. The polyoxyalkylene polyols, preferably polyoxypropylene and polyoxypropylene-polyoxyethylene polyols, have a functionality of from 2 to 8 and hydroxyl numbers of from 25 to 370, where, as already indicated, polyoxyalkylene polyols having a functionality of from 2 to 3 and a hydroxyl number of from 30 to 80 are preferably used for isocyanate semiprepolymers for flexible PU foams and polyoxyalkylene polyols having a functionality of from 3 to 8 and a hydroxyl number of from 100 to 350 are preferably used for semirigid and rigid PU foams, and suitable polyoxytetramethylene glycols have a hydroxyl number of from 30 to about 280. Other suitable polyoxyalkylene polyols are polymer-modified polyoxyalkylene polyols, preferably grafted polyoxyalkylene polyols, in particular those based on styrene and/or acrylonitrile which are prepared by in situ polymerization of acrylonitrile, styrene or preferably mixtures of styrene and acrylonitrile, e.g. in a weight ratio of from 90:10 to 10:90, preferably from 70:30 to 30:70, advantageously in the specified polyoxyalkylene polyols using methods similar to those given in the German Patent 11 11 394, 12 22 669 (U.S. Pat. Nos. 3,304,273, 3,383,351, 3,523,093), 11 52 536 (GB 10 40 452) and 11 52 537 (GB 987 618), and also polyoxyalkylene polyol dispersion containing as dispersed phase, usually in an amount of from 1 to 50% by weight, preferably from 2 to 25% by weight: eg. polyureas, polyhydrazides, polyurethanes containing bound tert-amino groups and/or melamine, and which are described, for example, in EP-B-011 752 (U.S. Pat. No. 4,304,708), U.S. Pat. No. 4,374,209 and DE-A-32 31 497. Like the polyester polyols, the polyoxyalkylene polyols can be used individually or in the form of mixtures. Furthermore, they can be mixed with the grafted polyoxyalkylene polyols or polyester polyols and also with the hydroxyl-containing polyesteramides, polyacetals and/or polycarbonates. Suitable polyhydroxyl compounds from regenerable raw materials are, for example, castor oil, soy oil, rapeseed oil, tall oil, linseed oil, etc., alkoxylation products from such natural materials an products from boiling ketoneformaldehyde resins with hydroxyl-functional natural materials such as castor oil. Suitable hydroxyl-containing polyacetals are, for example, the compounds which can b prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals. Suitable hydroxyl-containing polycarbonates are those of the type known per se which can be prepared, for example, by reacting diols such as 1,3 -propanediol, 1,4-butanediol and/or 1,6-hexanediol, diethylene glycol, triethylene glycol or tetraethylene glycol with diaryl carbonates, eg. diphenyl carbonate, or phosgene. The polyesteramides include, for example, the predominantly linear condensates obtained from polybasic, saturated and/or unsaturated carboxylic acids or their anhydrides and polyhydric saturated and/or unsaturated amino alcohols or mixtures of polyhydric alcohols and amino alcohols and/or polyamines. The lignin-free, relatively high molecular weight polyhydroxyl compounds (A2) can, depending on the application of the isocyanate semiprepolymer mixtures, be completely or preferably partially replaced by low molecular weight chain extenders and/or crosslinkers. In the preparation of isocyanate semiprepolymers for flexible PU foams, the addition of chain extenders, crosslinkers or, if desired, mixtures thereof can be found to be advantageous for modifying the mechanical properties of the PU foams, eg. the hardness. In the preparation of isocyanate semiprepolymers for PU rigid foams, the use of chain extenders and/or crosslinkers can usually be omitted. Chain extenders used can be difunctional compounds, crosslinkers can be trifunctional and higher-functional compounds, each having molecular weights of less than 400, preferably from 2 to about 300. Examples of chain extenders which may be mentioned are alkanediols, for example those having from 2 to 6 carbon atoms in the alkylene radical, such as ethanediol, 1,3-propanediol, 1,4-butanediol, 1,5-pentanediol and 1,6-hexanediol and diethylene glycols such as diethylene, dipropylene and dibutylene glycol, and examples of crosslinkers are alkanolamines, eg. ethanolamine, dialkanolamines, eg. diethanolamine, and trialkanolamines, eg. triethanolamine and triisopropanolamine, and trihydric and/or higher-hydric alcohols such as glycerol, trimethylolpropane and pentaerythritol. Further suitable chain extenders or crosslinkers are the lo molecular weight ethoxylation and/or propoxylation products, for example those having molecular weights up to about 400, of the abovementioned polyhydric alcohols, alkylene glycols, alkanolamines and also of aliphatic and/or aromatic diamines. Chain extenders which are preferably used are alkanediols, in particular 1,4-butanediol and/or 1,6-hexanediol, alkylene glycols, in particular ethylene glycol and propylene glycol, and preferred crosslinkers are trihydic alcohols, in particular glycerol and trimethylolpropane, dialkanolamines, in particular diethanolamine, an trialkanolamines, in particular triethanolamine. The chain extenders and/or crosslinkers which are preferably used in the preparation of isocyanate semiprepolymers for flexible PU foams can be us ed, for example, in amounts of from 2 to 60% by weight, preferably from 10 to 40% by weight, based on the total weight of the polyhydroxyl compounds (A).

B) The organic polyisocyanates used for preparing the isocyanate semiprepolymers can be, as already indicated, for example, aliphatic, cycloaliphatic and preferably aromatic polyisocyanates. Specific examples are: alkylene diisocyanates containing from 4 to 12 carbon atoms in the alkylene radical, such as dodecane 1,12-diisocyanate 2-ethyltetramethylene 1,4-diisocyanate, 2-methylpentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any desired mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenyl-polymethylene polyisocyanates raw MDI) and mixtures of raw MDI and tolylene diisocyanates The organic diisocyanates and polyisocyanates can be use either individually or in the form of their mixtures. Organic polyisocyanates which have been found to be very useful are mixtures of diphenylmethane diisocyanates and polyphenyl-polymethylene polyisocyanates, preferably those having a diphenylmethane diisocyanate content of at least 45% by weight, for example from 45 to 95% by weight and in particular from 48 to 60% by weight, so that such raw MDI compositions are particularly preferably used.

C) The isocyanate semiprepolymers usable according to the invention can be prepared in the absence and preferably in the presence of catalysts, wit catalysts (C) preferably used being compounds which strongly accelerate the reaction of the hydroxyl-containing compounds (A) with the organic polyisocyanates (B). Suitable catalysts are, for example, organic metal compounds, preferably organic tin compounds such as tin(II) salts of organic carboxylic acids, eg. tin(II) acetate, tin(II) octoate, tin(II) ethylhexanoate and tin (II) laurate, and the dialkyltin(IV) salts of organic carboxylic acids, eg. dibutyltin diacetate, dibutyltin dilaurate, dibutyltin maleate, dioctyltin diacetate and dibutyltin dimercaptide, and strongly basic amines, for example amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, dimorpholine diethyl ether, N,N,N',N'-tetramethylethylenediamine, N,N,N',N'-tetramethylbutanediamine, N,N,N',N'-tetramethylhexane-1,6-diamine, di(4-dimethylaminocyclohexyl)methane, pentamethyldiethylenetriamine, bis(dimethylaminoethyl) ether, bis(dimethylaminopropyl) urea, dimethylpiperazine, 1,2-dimethylimidazole, 1-azabicyclo[3.3.0]-octane, alkanolamine compounds such as triethanolamine, triisopropanolamine, N-methyldiethanolamine and N-ethyldiethanolamine and dimethylethanolamine, tris(dialkylaminoalkyl)s-hexahydrotriazines, in prticular tris(N,N-dimethylaminopropyl)-s-hexahydrotriazine, tetraalkylammonium hydroxides such as tetramethylammonium hydroxide and preferably 1,4-diazabicyclo[2.2.2] octane. Preference is given to using from 0.001 to 5% by weight, in articular from 0.05 to 2% by weight, of catalyst or catalyst combination based on the weight of the polyhydroxy compound (A).

The preparation of the isocyanate semiprepolymers usable according to the invention can further be carried out in the absence or presence of surface-active substances (D), blowing agents (E) and further additives (F). However, according to a preferred variant for the preparation, these formative components (D) to (F) are advantageously incorporated i to the isocyanate semiprepolymer prepared beforehand in a separate process step.

D) Suitable surface-active substances (D) are, for example, compounds which serve to id the homogenization of the isocyanate semiprepolymer mixtures and may also be suitable for regulating the cell structure of the PU foams. Examples which may be mentioned are emulsifiers such as the sodium salts of castor oil sulfates or of fatty acids and also salts of fatty acids with amines, eg. diethylamine oleate, diethanolamine stearate, diethanolamine ricinoleate, salts of sulfonic acids, eg. alkali metal or ammonium salts of dodecylbenzenesulfonic or dinaphthylmethanedisulfonic acid and ricinoleic acid; foam stabilizers such as siloxaneoxyalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as pyrogenic silica, paraffins, fatty alcohols and dimethylpolysiloxanes. Oligomeric polyacrylates containing polyoxyalkylene and fluoroalkane radicals as side groups are also suitable for improving the emulsifying action, the cell structure and/or stabilization of the foam. The surface-active substances are usually used in amounts of from 0.01 to 5 parts by weight, based on 100 parts by weight of the polyhydroxyl compounds (A).

E) Suitable blowing agents (E) are liquids and gases which are liquid at room temperature and which are inert toward the liquid isocyanate semiprepolymers and have boiling points below 50° C., in particular between −50° C. and 30° C., at atmospheric pressure, and also mixtures of gaseous and liquid blowing agents. Examples of such preferred gases and liquids are alkanes such as propane, n- and iso-butane, n- and iso-pentane, preferably industrial mixtures of n- and iso-pentane, and cyclopentane, alkyl ethers such as dimethyl ether, diethyl ether and methyl isobutyl ether, alkyl carboxylates such as methyl formate and halogenated hydrocarbons such as dichlorofluoromethane, trifluoromethane, 1,1-dichloro-1-fluoroethane, monochlorotrifluoroethane, monochlorodifluoroethane, difluoroethane, dichlorotrifluoroethane, monochlorotetrafluoroethane, pentafluoroethane, tetrafluoroethane and dichloromonofluoroethane. The blowing agents mentioned by way of example can be used individually or as mixtures. Blowing agents which are not used are chlorofluorocarbons which damage the ozone layer. The gases and/or liquids having boiling points below 50° C. can also be used in admixture with (cyclo)alkanes, for example hexane and cyclohexane, and alkyl carboxylates, for example ethyl formate, having boiling points above 50° C. as long as the blowing agent mixture advantageously has a boiling point below 38° C. and has a blowing action which is sufficient to express the pressurized isocyanate semiprepolymer mixture from the pressure container and to foam it to give a PU foam. Blowing agents which are preferably used are mixtures of alkanes, in particular butane and/or propane, and a liquid having a boiling point below 50° C. The required amount of blowing agent or mixture an be experimentally determined in a simple manner as a function of the type of blowing agent or blowing agent mixture and also the mixing ratios. The blowing agents are usually used in an amount of from 10 to 40% by weight, preferably from 13 to 30% by weight, based on the weight of the isocyanate semiprepolymers. In the pressurized isocyanate semiprepolymer mixture, the blowing agents are present virtually completely in liquid form.

F) In place of the surface-active substances (D) or preferably in addition to these, it is also possible to incorporate further additives (F) into the isocyanate semiprepolymers. Examples which may be mentioned are flame retardants, plasticizers, fillers, dyes, pigments, hydrolysis inhibitors and fungistatic and/or bacteriostatic substances. Suitable flame retardants are, for example, diphenyl cresyl phosphate, tricresyl phosphate, tris(2-chloroethyl) phosphate, tris(2-chloropropyl phosphate, tris(1,3-dichloropropyl) phosphate, tris(2,3-dibromopropyl) phosphate and tetrakis(2-chloroethyl)ethylene diphosphate. Apart from the halogen-substituted phosphates mentioned, it is also possible to use in organic flame retardants such as hydrated aluminum oxide, antimony trioxide, arsenic oxide, ammonium polyphosphate, expanded graphite and calcium sulfate or cyanuric acid derivatives, eg. melamine, or mixtures of at least two flame retardants such as ammonium polyphosphates and melamine and/or expanded graphite and also, if desired, starch for making the PU foams produced from isocyanate semiprepolymer mixtures flame resistant. In general, it has been found to be advantageous to use from 5 to 50 parts by weight, preferably from 10 to 40 parts by weight, of the specified flame retardants or mixtures per 100 parts by weight of the isocyanate semiprepolymer mixture. It can also be advantageous to incorporate plasticizers into the isocyanate semiprepolymer mixture so as to reduce the tendency toward brittleness of the PU foams produced. Use can be made, for example, of the plasticizing agents known per se, for example butyl benzyl phthalate, dioctyl phthalate, etc. However, it has found to be advantageous to use phosphorus-containing and/or halogen containing compounds such as the abovementioned flame retardants since these additionally increase the flame resistance of the PU foams. For the purposes of the present invention, fillers, particularly reinforcing fillers, are the customary organic and inorganic fillers and reinforcements known per se. Specific examples are: inorganic fillers such as siliceous minerals, for example sheet silicate such as antigorite, serpentine, hornblends, amphiboles, chrysotile, zeolites, talc; metal oxides such as kaolin, aluminum oxides, aluminum silicate, titanium oxides and iron oxides, metal salts such as chalk, barite and inorganic pigments such as cadmium sulfide, zinc sulfide and also glass particles. Suitable organic fillers are, for example: carbon black, melamine, rosin, cyclopentadienyl resins and graft polymers. The inorganic and organic fillers can be used either individually or as mixtures and are advantageously incorporated into the reaction mixture n amounts of from 0.5 to 50% by weight, preferably from 1 to 10% by weight, based on the weight of the isocyanate semiprepolymers. Further details of the abovementioned other customary additives (F) can be found in the specialist literature, for example the monograph of J. H. Saunders and K. C. Frisch "High Polymers" volume XVI, Polyurethanes, Parts 1 and 2, Interscience Publishers 19 2 or 1964, or in the Kunststoff-Handbuch, Polyurethane, Volume VII, Carl Hanser Verlag, Munich, Vienna, 1st and 2nd edition, 1966 and 1983.

The pressurized isocyanate semiprepolymer mixtures of the invention can be prepared by known methods.

According to one process variant, for example, the polyhydroxyl compounds (A) can be reacted with the polyisocyanates (B) in the required amounts in the presence or absence of a catalyst at from 20° to 120° C., preferably from 40° to 90° C., to give the isocyanate semiprepolymer which can subsequently be mixed, if desired, with surface-active substances (D) and further additives (F), introduced into a pressure contained and treated in the latter with the blowing agent (E). According to another process variant, the isocyanate semiprepolymer preparation can be carried out in the presence or absence of catalysts and, if desired, surface-active substances (D), other additive (F) and in the presence of blowing agents (E) in a suitable pressure container. The isocyanate semiprepolymer mixture obtained can then be packed in suitable containers of different size, or example aerosol cans having capacities of, for example, from 0.5 to 5 liters or pressure containers having capacities of, or example, from 50 to 100 liters as are customary for the industrial sector. According to a preferred embodiment, the polyhydroxyl compounds (A) are mixed with the catalysts (C), surface active substances (D) and, if desired, further additives (F) to give a polyol component. The polyol component is mixed in a suitable container with the organic polyisocyanates and the mixture obtained is treated by means of a filling apparatus with the blowing agent (E). Mixing of the formative components forms the isocyanate semiprepolymer mixture.

To produce the dimensionally stable PU foams, the pressurized isocyanate semiprepolymer mixture is allowed to depressurize to atmospheric pressure by means of a suitable device, eg. a valve. The isocyanate semiprepolymer mixture is expressed by means of the internal pressure of the container. The isocyanate semiprepolymer mixture foams under atmospheric pressure and rapidly cures by reaction with the atmosphere, in particular with the water vapor present in the atmosphere.

The pressurized, blowing agent-containing isocyanate semiprepolymer mixtures of the invention can be used for producing single-component PU foams which can serve, for example, for filling hollow spaces and cracks, as sealants, insulation material, etc.

The essentially dimensionally s able PU foams usually have, depending on the blowing agents and the amounts thereof, a density of from 15 to 25 g/liter, preferably from 17 to 23 g/liter.

EXAMPLES

Example 1

The polyol component used was a mixture comprising:
825 parts by weight of a lignin-initiated polyoxypropylene polyol having a hydroxyl number of 50,
700 parts by weight of castor oil having a hydroxyl number of 165,
800 parts by weight of a glycerol-initiated polyoxypropylenepolyoxyethylene polyol having a hydroxyl number of 42,
450 parts by weight of a soy oil polyol having a hydroxyl number of 150,
250 parts by weight of a trifunctional, dimeric fatty acid ester having a hydroxyl number of 350 (Priplast® 3184 from Unichema Chemie B. V.)
200 parts by weight of diethylene glycol,
125 parts by weight of a foam stabilizer based on silicone (Tegostab® B 8905 from Goldschmidt A. G.),
50 parts by weight of di(2-morpholinoethyl) ether and
1,600 parts by weight of trichloropropyl phosphate The polyol component contained based on the total weight, 25.6% by weight of the lignin-initiated polyoxypropylene polyol.

A 1 liter tinplate can was charged with
310 g of the polyol component and
405 g of a mixture of diphenylmethane diisocyanates and polyphenyl-polymethylene polyisocyanates (raw MDI) having a diphenylmethane diisocyanate content of 48% by weight, based on the total weigh of the mixture.

The tinplate can was closed with a valve so as to be gastight and the following were introduced n succession into the polyol/raw MDI mixture through the valve by means of a gas filling apparatus, with intensive shaking:
32 g of dimethyl ether,
48 g of a mixture of about 80 by weight of butane and about 20% by weight of propane and
27 g of trifluoroethane.

The content of liquefied gas b owing agent in the isocyanate semiprepolymer mixture was 13% by weight.

To complete the formation of the isocyanate semiprepolymer, the tinplate can together with contents was stored at 50° C. for 24 hours.

The valve of the tinplate can was provided with a plastic ring having an external thread. By means of this external thread of the plastic ring, the tinplate can was screwed onto a foam gun and the discharge rate (amount discharged per unit time) was measured as an indirect quality criterion for the viscosity of the isocyanate semiprepolymer mixture. The discharge rate was 104 g/10 seconds.

Comparative Example 1

This was carried out similarly to Example 1, but in place of the lignin-initiated polyoxypropylene polyol, 825 parts of a lignin-free polyoxypropylene polyol having the same functionality and hydroxyl number were used.

The discharge rate of the isocyanate semiprepolymer mixture was 68 g/10 seconds.

Example 2

The polyol component used was a mixture comprising:
1,750 parts by weight of a lignin-initiated polyoxypropylene polyol having a hydroxyl number of 50,
500 parts by weight of a soy oil polyol having a hydroxyl number of 150,
250 parts by weight of a glycerol-initiated polyoxypropylene-polyoxyethylene polyol having a hydroxyl number of 42,
400 parts by weight of a trifunctional, dimeric fatty acid ester having a hydroxyl number of 350 (Priplast® 3148 from Unichema Chemie B. V.)
250 parts by weight of diethylene glycol,
125 parts by weight of a foam stabilizer based on silicone (Tegostab® B 8905 from Goldschmidt A G),
50 parts by weight of di(2-morpholinoethyl) ether and
1,650 parts by weight of trichloropropyl phosphate The polyol component contained based on the total weight, 50.7% by weight of the lignin-initiated polyoxypropylene polyol.

310 g of the polyol component and 405 g of the raw MDI describe in Example 1 were charged into a 1 liter tinplate can in a manner similar to Example 1 and the mixture was treated in succession with
35 g of dimethyl ether,
35 g of a mixture of about 80 by weight of butane and about 20% by weight of propane and
46 g of trifluoroethane
as blowing agent.

The content of liquefied gas blowing agent in the isocyanate semiprepolymer mixture was 14% by weight.

To complete the formation of the isocyanate semiprepolymer, the tinplate can together with contents was stored at 50° C. for 24 hours and the discharge rat was then determined in a similar manner to Example 1; the discharge rate was 86 g/10 seconds.

Comparative Example II

This was carried out similarly to Example 2, but in place of the lignin-initiated polyoxypropylene polyol, 1,750 parts by weight of a lignin-free polyoxypropylene polyol having the same functionality and hydroxyl number were used. The discharge rate of the isocyanate semiprepolymer mixture was 54 g/10 seconds.

Determination of the dimensional stability of PU foams produced from the isocyanate semiprepolymer mixtures.

3 test specimens were produced from the isocyanate semiprepolymer mixtures prepared in the tinplate cans as described in Examples 1 and 2.

For comparative purposes, the polyol components of the Comparative Examples I and II were each admixed with 5% by weight, based on the weight of the polyol component, of 2-ethylhexyl adipate, a conventional solvent and diluent described in the patent literature, so as to achieve discharge rates comparable with those of the isocyanate semiprepolymer mixtures of the invention.

Isocyanate semiprepolymer mixtures modified in this way were introduced into 1 l tinplate cans in a manner similar to Comparative Examples I and II and converted into PU foams by depressurization.

The mold for determining the dimensional stability comprised two particleboards veneered on both sides and having dimensions of 18 mm (thickness)×250 mm×115 mm, which had an open gap of 20 mm set by means of laterally arranged wooden positioners.

The test specimens were produced by filling the gap between the particle boards, which had been moistened with water, with foam. After the PU foam had cured, the foam which had exuded from the mold was cut off and the wooden positioners were removed. The arithmetic mean of the spacing of the particleboards, measured at the corners of the test specimens, gives an initial value for the measurement of the dimensional stability. After storing the test specimens for 14 days at 40° C. and a relative atmospheric humidity of 90%, the measurement was repeated. From two measurements on each of the test specimens (before and after storage), the relative change was calculated in % and serves as a measure of the dimensional stability. The mean of dimensional stabilities in % measured on 3 test specimens gives the measured value in the table below. Test specimens having a measured value of less than 10% have a sufficient dimensional stability.

The measurement, by the method described, of the dimensional stability of PU foams produced from the isocyanate semiprepolymers described in Examples 1 and 2 and the isocyanate semiprepolymers described in the Comparative Examples I and II modified by the addition of 2-ethylhexyl adipate (EHA) gave the results summarized in the table below.

TABLE

| Isocyanate semiprepolymer mixture from | Dimensional stability [%] |
|---|---|
| Example 1 | 3.7 |
| Comparative Example I (modified with EHA) | 17.5 |
| Example 2 | 3.3 |
| Comparative Example II (modified with EHA) | 16.2 |

We claim:

1. A pressurized, blowing agent-containing isocyanate semiprepolymer mixture obtained by reacting
   A) at least one relatively high molecular weight polyhydroxyl compound with
   B) at least one organic polyisocyanate
in a reaction vessel in the presence of at least one blowing agent or by treatment of the isocyanate semiprepolymer formed without blowing agent with at least one blowing agent, wherein the polyhydroxyl compound (A) used is at least one alkoxylated lignin (A1) ha zing a hydroxyl number of from 30 to 80.

2. A pressurized, blowing agent-containing isocyanate semiprepolymer mixture as claimed in claim 1, wherein the relatively high molecular weight polyhydroxyl compound (A) used is a mixture containing, based on the total weight, from 5 to.65% by weight of at least one alkoxylated lignin (A1) having a hydroxyl number of from 30 to 80.

3. A pressurized, blowing agent-containing isocyanate semiprepolymer mixture as claimed in claim 1 or 2, wherein the organic polyisocyanate (B) used is a mixture of diphenylmethane diisocyanates and polyphenyl-polymethylene polyisocyanates.

4. A pressurized, blowing agent-containing isocyanate semiprepolymer mixture obtained by reacting
   A) at least one relatively high molecular weight polyhydroxyl compound with
   B) at least one organic polyisocyanate in the presence of
   C) catalysts,
   D) surface-active substances and
   E) if desired, blowing agents and
   F) if desired, further additives
in a reaction vessel in the presence of a blowing agent or by treating the isocyanate semiprepolymer formed without blowing agent with a blowing agent wherein the polyhydroxyl compound (A) used is at least one alkoxylated lignin (A1) having a hydroxyl number of from 30 to 80.

5. A pressurized, blowing agent-containing isocyanate semiprepolymer mixture as claimed in claim 4, wherein the relatively high molecular weight polyhydroxyl compounds (A) used are a mixture containing, based on the total weight, from 5 to 65% by weight of at least one alkoxylated lignin (A1) having a hydroxyl number of from 30 to 80.

6. A pressurized, blowing agent-containing isocyanate semiprepolymer mixture as claimed in claim 4 or 5, wherein the organic polyisocyanate (B) used is a mixture of diphenylmethane diisocyanates and polyphenyl-polymethylene polyisocyanates.

7. A pressurized, blowing agent-containing isocyanate semiprepolymer mixture as claimed in any of claims 1, 2, 4 or 5, wherein the isocyanate semiprepolymers have an NCO content of from 5 to 25% by weight.

8. A process for producing single-component polyurethane foam by depressurizing a blowing agent-containing isocyanate semiprepolymer mixture pressurized in a pressure container as claimed in any of claims 1 to 7.

9. A process for producing dimensionally stable polyurethane foams by depressurizing a storage-stable, pressurized, blowing agent-containing isocyanate semiprepolymer mixture based on polyhydroxyl compounds (A) and organic polyisocyanates (B) and allowing it to cure in contact with the atmosphere, wherein the polyhydroxyl compound (A) used for preparing the isocyanate semiprepolymer is an alkoxylated lignin (A1) having a hydroxyl number of from 30 to 80.

10. A process as claimed in claim 9, wherein the polyhydroxyl compounds (A) used are a mixture comprising, based on the total weight of (A)
   A1) from 5 to 65% by weight of at least one alkoxylated lignin having a hydroxyl number of from 30 to 80 and
   A2) from 95 to 35% by weight of at least one lignin-free polyhydroxyl compound having a functionality of from 2 to 8 and a hydroxyl number of from 25 to 370.

11. A process as claimed in claim 9 or 10 wherein the alkoxylated lignins are lignin-initiated polyoxypropylene polyols or polyoxypropylene-polyoxyethylene polyols.

12. A process as claimed in any of claims 9 or 10, wherein the organic polyisocyanates (B) comprise a mixture of diphenylmethane diisocyanates and polyphenyl-polymethylene polyisocyanates, wherein mixture has a diphenylmethane diisocyanate content of at least 45% by weight.

* * * * *